March 1, 1955 J. H. GOODWILL 2,703,028
ENGINEER'S VISE
Filed Sept. 11, 1952 2 Sheets-Sheet 1
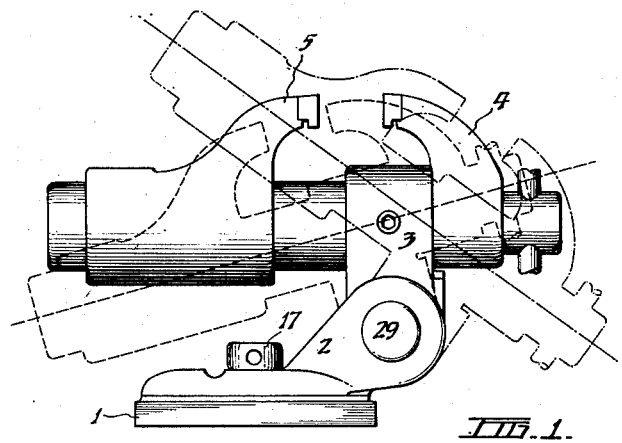
FIG. 1.
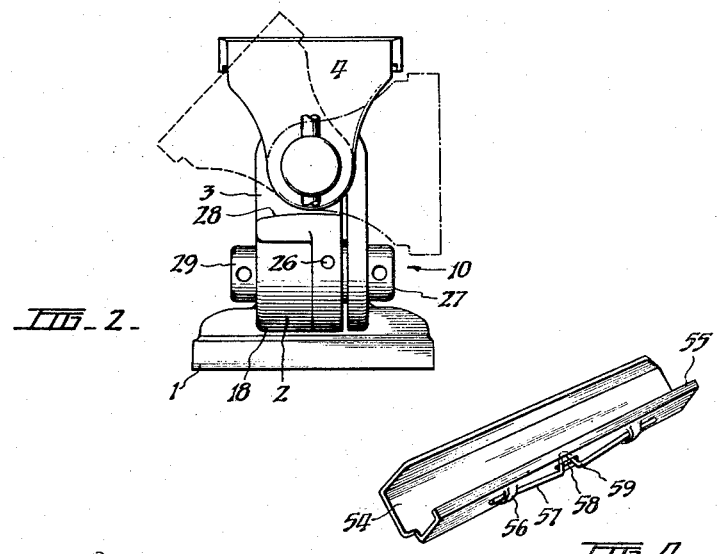
FIG. 2.
FIG. 4.
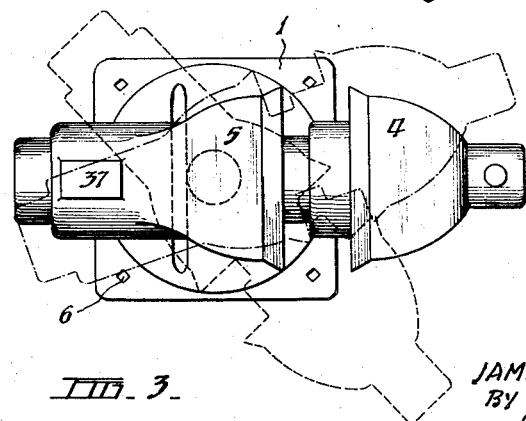
FIG. 3.
INVENTOR
JAMES HAMILTON GOODWILL
BY Oberlin & Limbach
ATTORNEYS.

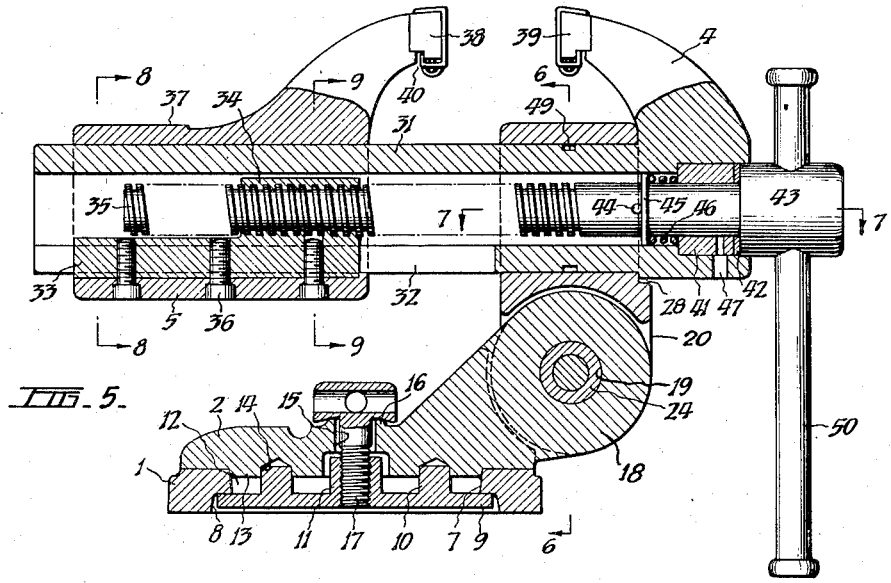

United States Patent Office 2,703,028
Patented Mar. 1, 1955

2,703,028

ENGINEER'S VISE

James Hamilton Goodwill, Kew, near Melbourne, Victoria, Australia

Application September 11, 1952, Serial No. 308,995

2 Claims. (Cl. 81—41)

This invention relates to an improved engineer's vise, and it refers particularly to a bench vise constructed so that its jaws may be adjusted angularly relative to the base of the vise.

It is well-known to construct vises so made that the jaws may be turned about an axis which is in itself pivotal so that the jaws may be set to any position in any plane. But, as hitherto constructed, such vises have either been made so that the jaws are mounted upon a ball member which is pivotal in a socket or been made such that some of the components of the major forces applied to the vise have been absorbed by friction only. Whilst such constructions of vises permit of adjustment of the angularity of the jaws the vise so made does not possess the standard of rigidity and firmness which is required by expert engineers such as toolmakers and instrument makers. Furthermore, the means for clamping in position the jaws in such a vise are relatively weak and a vise so made will not withstand the pressures and forces which it will be required to withstand during normal usage.

The invention has been devised principally with the object of providing an engineer's vise which will be so constructed that the vise will have a greater range of utility than bench vises as hitherto made. A subsidiary object is to devise a bench vise wherein the jaws may be set so as to travel longitudinally, transversely or vertically. A dependent object is to provide efficient means for clamping the jaws in any desired angular position. A further object is to devise a bench vise which will be of extremely sturdy design and construction, and such that the jaws of the vise may be moved accurately by the screw with very little, if any, back lash. Other objects of the invention are to provide a bench vise having its jaws adapted to be moved simultaneously relative to the base of the vise, in a longitudinal direction; having an operating handle adapted to be held at any set position relative to the screw of the vise; having its jaws so mounted that in normal operation an object held between the jaws will have its center close to the center of support of the vise; and being adapted to have fitted to it a pair of jaw covers which will not readily slip out of position when once correctly fitted to the jaws of the vise.

In order that the invention will be clearly understood and readily put into practical effect I shall now describe in detail, with reference to the accompanying sheets of illustrative drawings, a preferred construction of vise made according to the invention. In these drawings:

Figs. 1, 2 and 3 are, respectively, views of the vise in side and front elevation and in plan, dotted and chain dotted lines being used to indicate alternative positions of the jaws in each view;

Fig. 4 shows, in perspective, one of the jaw covers forming part of this invention;

Fig. 5 illustrates a part longitudinal cross-section through the vise, the jaws and jaw covers being shown in full view;

Fig. 6 is a transverse cross-section of the vise on the line and in the direction indicated by the arrows 6—6 in Fig. 5;

Fig. 7 shows a longitudinal cross-section through the vise screw, the section being taken on the line and in the direction indicated by the arrows 7—7 in Fig. 5;

Figs. 8 and 9 are further transverse cross-sections on the lines and in the direction indicated by the arrows 8—8 and 9—9 respectively, of Fig. 5;

Fig. 10 is a view in the direction of the arrow 10 in Fig. 2; and

Fig. 11 shows a cross-sectional view through the devices for clamping the jaws of the vise against tilting movement in the direction indicated by the dotted and chain dotted lines in Fig. 1, and is taken on the line and in the direction indicated by arrows 11—11 in Fig. 6.

In the following description and claims the directions "vertical" and "horizontal" are to be considered as indicating the appropriate directions as determined by reference to the drawings.

The engineer's vise illustrated in these drawings has a base plate 1 for attachment to a bench or other suitable support, a body member 2 pivotally fitted to the base 1 so as to be adapted to be swung about a vertical axis (see Fig. 3), and a head member 3 pivotally fitted to the body 2 so as to be adapted to be swung pivotally about a horizontal axis (see Fig. 1), and jaw members 4 and 5 mounted relative to the head member 3 so as to be adapted to be moved longitudinally, and also to be moved pivotally about a longitudinal axis through the head member 3 (see Fig. 2).

The base 1—in this particular construction—is made substantially rectangular in plan view with a fastening opening 6 near each of its corners so as to enable the vise to be readily bolted to a bench or other suitable support. A relatively large diameter opening 7 is formed through the base 1, and on the underside of the base the opening is enlarged at 8. Fitted within the enlarged part 8 of the opening is a clamping plate 9 having two diametrically opposed spigots 10 extending upwardly from its upper surface, and a central tapped boss 11. The opening 7 adjacent the upper surface of the base 1 forms a recess 12.

The body 2 has a part of substantially circular shape which is adapted to bear upon the upper surface of the base and the underside of that circular portion is machined to form a spigot 13 adapted to fit neatly in the recess 12 of the base. In the underside of that spigot 13 there are diametrically opposed openings 14 adapted to accommodate the spigots 10 of the clamping plate 9. A hole 15 is formed vertically through the circular part of the body 2 and a land 16 is formed about that central opening. A clamping screw 17—having a capstan type head recessed on its underside so as to engage with that land—is fitted through the hole 15 in the body and screwed into the boss 11 of the clamping plate 9.

By tightening the clamping screw 17 the body member 2 may be locked in any set position relative to the base. Extending forwardly from the circular part of the body is a boss or neck 18 having a bore 19 formed horizontally through it.

The vise head 3 has a part which fits over the boss or neck 18 of the body and it has a downwardly extending portion 20 which is complementary to said neck or boss 18, being formed with a horizontal bore 21 which is in axial alignment with the bore 19—see particularly Fig. 6. The boss or neck 18 and the portion 20 of the head 3 are both of somewhat circular shape and that portion of the head 3 which fits over the neck 18 is also curved arcuately so that the head 3 may be moved pivotally relative to the neck 18. The head 3 also has a horizontal bore 22 at right angles to the bore 21, and the portion 20 of the head is slotted or divided—at 23—not quite tangential to the bore 22. An internally screw-threaded sleeve 24 is fitted in the bore 19 of the neck 18 and in the bore 21 of the head portion 20 and said sleeve 24 has a head portion 25 of enlarged diameter which fits within an enlargement of the bore 21—see Fig. 6. This sleeve 24 is held against movement relative to the head 3 by means of a pin 26 which is fitted into a hole formed longitudinally in the head portion 20 so as to seat tightly in a shallow chordal groove formed across the outer surface of the sleeve 24. The head 25 of the sleeve 24 seats against the inner side of the slotted part 23 and provides additional support against longitudinal movement.

A capstan headed clamping screw 27 is engaged in one end portion of the sleeve 24—that end formed with the head 25—so that the head of the screw 27 is adapted to press against the outer side of the head portion 20 and thereby exert a clamping pressure upon a tubular jaw-supporting member 31 located in the bore 22. By loosening the screw 27 the jaws of the vise may be turned to any desired angular position, as indicated in Fig. 2. To provide a stop to limit that pivotal movement the front face of the head 3 is formed with a ledge 28. A second capstan headed screw 29 is engaged in the opposite end portion of the sleeve 24. Associated with this second screw 29 is a tapered seating member 30, which is keyed to the relative end of the sleeve 24—see Figs. 6 and 11—and engaged in a correspondingly shaped seating formed in the bore 19. By tightening this second screw 29 the head portion 20 will be clamped tightly against the boss or neck 18 of the body so as to hold the head 3 securely in position. By loosening the clamping screw 29 the head of the vise may be tilted forwardly or backwardly relative to the body in the manner indicated in Fig. 1.

The jaws of the vise are mounted upon a substantially cylindrical tubular support member 31 which fits through the longitudinal bore 22 of the head 3. The front jaw 4 is formed integrally with the tubular support 31 and the rear jaw member 5 is made with a parallel circular bore so as to slide neatly upon such support. The rear portion of the tubular support 31 is slotted longitudinally at 32 on the underside of the support and fitted in that slotted part is the rectangular base portion 33 of the vise nut 34. Said vise nut is substantially cylindrical in shape, having an appropriate internal screw thread formed through it, and it is formed integrally with the rectangular-shaped base 33. Said base is adapted to slide neatly within the longitudinal slot 32 in the tubular support 31. The cylindrical portion of the nut 34 fits relatively neatly within the longitudinal bore of the tubular support 31 and it is engaged by the vise screw 35. The base 33 of the vise nut 34 is securely fastened to the rear jaw member 5 by means of three screws 36 which are fitted through openings provided in longitudinally spaced arrangement at the underside of the jaw member 5 and engaged in tapped holes formed upwardly through the base 33 of the nut.

At the rear of the rear jaw member 5 there is provided a surface 37 which is accurately machined to be parallel with the plane of the upper surface of the rear jaw piece 38. Both the rear jaw piece 38 and the front jaw piece 39 are made so that their upper surfaces are inclined downwardly and outwardly and their under surfaces project downwardly a short distance in such manner that there is provided, in each case, a transverse recess 40.

The longitudinal bore of the tubular support 31 is enlarged at its front end so as to accommodate a sleeve 41 which fits relatively tightly in that enlarged portion of the bore. The vise screw 35 fits through the sleeve 41 and a washer 42 is located on the screw 35 adjacent the head 43 of said screw so as to bear upon the outer end of the sleeve 41. A pin 44 is fastened transversely through the screw 35 so as to hold in position a washer 45, and a short helical compression spring 46 is located between said washer 45 and the sleeve 41.

The washer 42 and sleeve 41 are assembled on the screw 45 and the spring 46, washer 45 and pin 44 fitted in position prior to the screw 35 being engaged in the tubular support 31, the sleeve 41 being a push fit in the enlarged end portion of the bore in the support 31 so that the screw 35 will be held securely in position but will be capable of being removed should it ever be necessary to do so.

An oiling hole 47 is formed through the underside of the jaw member 4 and said hole 47 communicates with a similar hole provided in the sleeve 41.

As will be apparent from the above description and from the illustrative drawings, rotation of the screw 35 will cause the rear jaw member 5 to move longitudinally of the tubular support 31 and the front jaw member 4 will remain stationary. This has the advantage that an object held between the jaw pieces 38 and 39 will be held closer to the center of support of the vise—in the preferred construction this will be the center line of the clamping screw 17—than is the case with vises of conventional construction in which the rear jaw is fixed and the front jaw moves outwardly, or away from the center of support of the vise, when the jaw is being opened. It is to be noted that in the construction according to this invention the further apart the jaws the closer is the center line between the two jaw pieces 38 and 39 to the center of support of the vise. Consequently, the larger the object gripped by the jaws the smaller is the moment arm or lever arm of that object about the center of support.

The two jaw members 4 and 5 are normally held against longitudinal movement, as a unit, by means of a socket-headed screw 48 which is screwed into a tapped hole provided in the side of the head 3 so as to engage in a circumferential groove 49 formed in the outerside of the tubular support 31 a short distance rearwardly of the front jaw member 4. When it is desired to turn the jaws pivotally about the central axis of the screw 35 the clamping screw 27 is loosened and the jaws are turned to required position—the screw 48 remaining in engagement with the groove 49 and not restricting such rotational movement but only linear movement of the tubular support 31.

However, in certain instances it is required to have the two jaws as far forward as possible—as when an object held between the jaws extends downwardly past the edge of the bench to which the vise is mounted. To adjust the location of the jaws as a unit it is merely necessary to slacken the clamping screw 27, unscrew the socket-headed screw 48 until it is retracted from the groove 49 and then move the composite jaw unit (consisting of the jaw members 4 and 5, tubular support 31 and vise screw 35) to any desired position, and finally clamp the jaws in set position by tightening the clamping screw 27.

The head 43 of the vise screw 35 has fitted through it an operating, or tommy bar 50. The tommy bar is fitted slidably in an opening formed diametrically through the head 43 and a chamber 51 is formed in the head 43 tangentially of the opening wherein the bar 50 is fitted. In that chamber 51 there is fitted a detent 52 and a helical compression spring 53. One end of the detent is arcuately shaped so as to be adapted to bear neatly upon the surface of the tommy bar 50 and, by the action of the spring 53, to hold that bar in any set position. The washer 42 fitted against the head 43 of the screw 35 holds the spring 53 and detent 52 in position.

The jaw covers are of the construction illustrated particularly in Fig. 4, being made from a suitable soft metal such as brass or copper. Each cover 54 is of somewhat channel shape in cross section, the lower side portion having an upturned flange 55 adapted to fit in the transverse recess 40 provided behind the downward extension of each of the jaw pieces 38 and 39. The lower side of the jaw cover has, at spaced locations, a pair of downwardly expressed loops or tongues 56 in which are fitted the opposite ends of a leaf spring 57.

This spring 57 has at an intermediate position in its length an upwardly curved portion 58 which extends through a rectangular slot 59 formed in the lower side of the jaw cover, the said upwardly curved portion being adapted to press upon the underside of the jaw piece so as to hold the jaw cover in correct position upon the jaw.

The bench vise made according to this invention will be found to have a large range of utility. The jaws may be turned about the longitudinal center line of the screw 35—as indicated in Fig. 2—so that the vise may be used in somewhat the same manner as the well-known "offset" vise; the body 2, head 3 and jaw members 4 and 5 may be turned pivotally about a vertical axis through the screw 17; and the head 3 and jaw members 4 and 5 may be turned pivotally about the horizontal axis through the sleeve 24—see Fig. 1—so that the vise may be used, for example, as a small vertical press. Furthermore, the jaw member 5 can be backed off of the tubular support 31, so that the latter may be readily removed from the head 3 whenever it is desired to use the jaws 4 and 5 for clamping purposes independently of the base 1, body 2 and head 3. It is also to be noted that as the rear jaw is movable by the screw 35, instead of the front jaw as is customary, the vise is of sturdy design and construction and will therefore withstand relatively hard usage.

What I do claim is:

1. A bench vise comprising in combination a base having a more or less centrally located vertical axis and having a load bearing surface on its top side which is normal to said vertical axis; a body having a load bearing surface on its underside which rests upon and coacts with said load bearing surface on said base and which is rotatable about said vertical axis, a boss mounted on said body, said boss extending radially outwardly from said central axis and containing a horizontal axis which is both parallel to said load bearing surfaces and normal to said radially extending boss, a head member rotatably connected at one end to said boss about said horizontal axis and containing jaw securing means on its other end, a first fixable jaw held in a position by said jaw securing means such that its work-gripping surface faces in the direction of said central vertical axis and is substantially parallel and adjacent to a plane containing said horizontal axis and a longitudinal center line of said head member, and a second movable jaw supported by said jaw securing means which cooperates with said first fixable jaw and which moves away from said fixed jaw in a direction toward said center vertical axis.

2. A bench vice comprising in combination a base having a more or less centrally located vertical axis and having a load bearing surface on its top side wihch is normal to said vertical axis, a body having a load bearing surface on its underside which rests upon and coacts with said load bearing surface on said base and which is rotatable about said vertical axis, a boss mounted on said body, said boss containing a frictional surface lying in a vertical plane containing said centrally located vertical axis, said boss also containing a horizontal axis through and perpendicular to said frictional surface, a head member rotatably attached at one end to said boss about said horizontal axis and containing a frictional surface which engages the frictional surface on said boss, said head member containing jaw securing means on its other end, a first fixable jaw held in a position by said jaw securing means such that its work-gripping surface faces in the direction of said central vertical axis and is substantially parallel and adjacent to a plane containing said horizontal axis and a longitudinal center line of said head member, and a second movable jaw supported by said jaw securing means which cooperates with said first fixable jaw and which moves away from said fixed jaw in a direction toward said central vertical axis.

References Cited in the file of this patent

UNITED STATES PATENTS

| Number | Name | Date |
|---|---|---|
| Re. 23,519 | Persson | July 1, 1952 |
| 307,453 | Galbraith | Nov. 4, 1884 |
| 632,381 | Theadore | Sept. 5, 1899 |
| 1,440,167 | Ober | Dec. 26, 1922 |
| 2,485,876 | Guest | Oct. 25, 1949 |